(12) United States Patent
Beach

(10) Patent No.: US 10,618,462 B2
(45) Date of Patent: Apr. 14, 2020

(54) ENCAPSULATION-EMBEDDED EXTERIOR-FACING LIGHT SET FOR VEHICLES, AND/OR METHOD OF MAKING THE SAME

(71) Applicant: Custom Glass Solutions, LLC, Worthington, OH (US)

(72) Inventor: Chad Christopher Beach, Jenera, OH (US)

(73) Assignee: Custom Glass Solutions, LLC, Worthington, OH (US)

( * ) Notice: Subject to any disclaimer, the term of this patent is extended or adjusted under 35 U.S.C. 154(b) by 0 days.

(21) Appl. No.: 15/340,309

(22) Filed: Nov. 1, 2016

(65) Prior Publication Data

US 2018/0118096 A1 May 3, 2018

(51) Int. Cl.
*B60Q 1/26* (2006.01)
*B32B 17/10* (2006.01)
(Continued)

(52) U.S. Cl.
CPC ........ *B60Q 1/268* (2013.01); *B32B 17/10036* (2013.01); *B32B 17/10541* (2013.01); *B32B 17/10761* (2013.01); *B32B 17/10788* (2013.01); *B60Q 1/2696* (2013.01); *B60Q 1/28* (2013.01); *B60Q 1/302* (2013.01); *B60Q 1/52* (2013.01); *F21S 43/14* (2018.01); *F21S 43/26* (2018.01); *F21V 21/0808* (2013.01);
(Continued)

(58) Field of Classification Search
CPC . B60Q 1/268; B60Q 1/26; B60Q 1/28; B60Q 1/2696; B60Q 1/52; B60Q 1/302; B60Q 2400/00; B32B 17/10788; B32B 17/10036; B32B 17/10761; B32B 17/10541; F21S 43/14; F21S 43/26; F21V 21/0808; F21V 23/001; F21Y 2115/10
See application file for complete search history.

(56) References Cited

U.S. PATENT DOCUMENTS 4,488,141 A 12/1984 Ohlenforst et al.
4,758,931 A 7/1988 Gabaldon
(Continued)

FOREIGN PATENT DOCUMENTS

WO  WO 2016/156720  10/2016

*Primary Examiner* — Kevin Quarterman
(74) *Attorney, Agent, or Firm* — Benesch Friedlander Coplan & Aronoff LLP

(57) ABSTRACT

Certain example embodiments relate to encapsulation-embedded exterior-facing light sets for vehicles, and/or methods of making the same. This system includes a main body portion. Wire guides are embedded in, and located along a channel of, the main body portion. Pockets are formed in the main body portion. Removable light sources are located in the pockets. A power and/or data cable is fed through the wire guides and through the channel of the main body portion, and is operably connected to the light sources. A groove is shaped and arranged to receive a windshield of the safety and/or protection vehicle such that, when the groove receives the windshield and the windshield is installed in the vehicle, the pockets and the light sources are external to the vehicle. The light sources may be LED light sources, with each pocket receiving plural LEDs provided on a respective LED module and associated optical element(s).

11 Claims, 5 Drawing Sheets

(51) Int. Cl.
   *F21S 43/14*    (2018.01)
   *F21S 43/20*    (2018.01)
   *B60Q 1/28*     (2006.01)
   *B60Q 1/30*     (2006.01)
   *B60Q 1/52*     (2006.01)
   *F21V 21/08*    (2006.01)
   *F21V 23/00*    (2015.01)
   *F21Y 115/10*   (2016.01)

(52) U.S. Cl.
   CPC .......... *F21V 23/001* (2013.01); *B60Q 1/2611* (2013.01); *B60Q 2400/00* (2013.01); *F21Y 2115/10* (2016.08)

(56) References Cited

U.S. PATENT DOCUMENTS

| | | | |
|---|---|---|---|
| 4,981,363 A | 1/1991 | Lipman | |
| 5,211,466 A * | 5/1993 | Jarocki | B60Q 1/302 362/540 |
| 6,229,436 B1 | 5/2001 | Ramsey | |
| 7,034,326 B2 * | 4/2006 | Noguchi | B32B 17/10036 219/203 |
| 7,048,422 B1 | 5/2006 | Solomon | |
| 7,082,721 B2 | 8/2006 | Whitehead | |
| 7,226,112 B2 | 6/2007 | Ward | |
| 7,967,486 B2 | 6/2011 | Ludwig et al. | |
| 8,235,460 B2 | 8/2012 | Plavetich et al. | |
| 8,382,350 B2 | 2/2013 | Gold | |
| 8,596,840 B2 | 12/2013 | Gold | |
| 8,829,539 B2 | 9/2014 | Kleo et al. | |
| 8,840,288 B2 | 9/2014 | Plavetich et al. | |
| 8,894,256 B2 | 11/2014 | Gold | |
| 9,108,569 B2 | 8/2015 | Gold | |
| 9,221,393 B2 | 12/2015 | Verrat et al. | |
| 9,783,122 B1 * | 10/2017 | VanEpps | B60R 11/00 |
| 2005/0088850 A1 * | 4/2005 | Miller | B60Q 1/268 362/503 |
| 2006/0275599 A1 | 12/2006 | Lefevre | |
| 2008/0036582 A1 | 2/2008 | Farley | |
| 2009/0174541 A1 | 7/2009 | Girouard | |
| 2012/0104789 A1 * | 5/2012 | Plavetich | B60Q 1/268 296/146.14 |
| 2015/0109805 A1 | 4/2015 | Verrat-Debailleul et al. | |
| 2015/0273986 A1 | 10/2015 | Benyahia et al. | |
| 2015/0276174 A1 * | 10/2015 | Trajlinek | F21V 7/0091 362/477 |
| 2016/0129771 A1 * | 5/2016 | Nakai | B60J 1/02 296/93 |
| 2017/0327031 A1 * | 11/2017 | Bauerle | B32B 17/10036 |

* cited by examiner

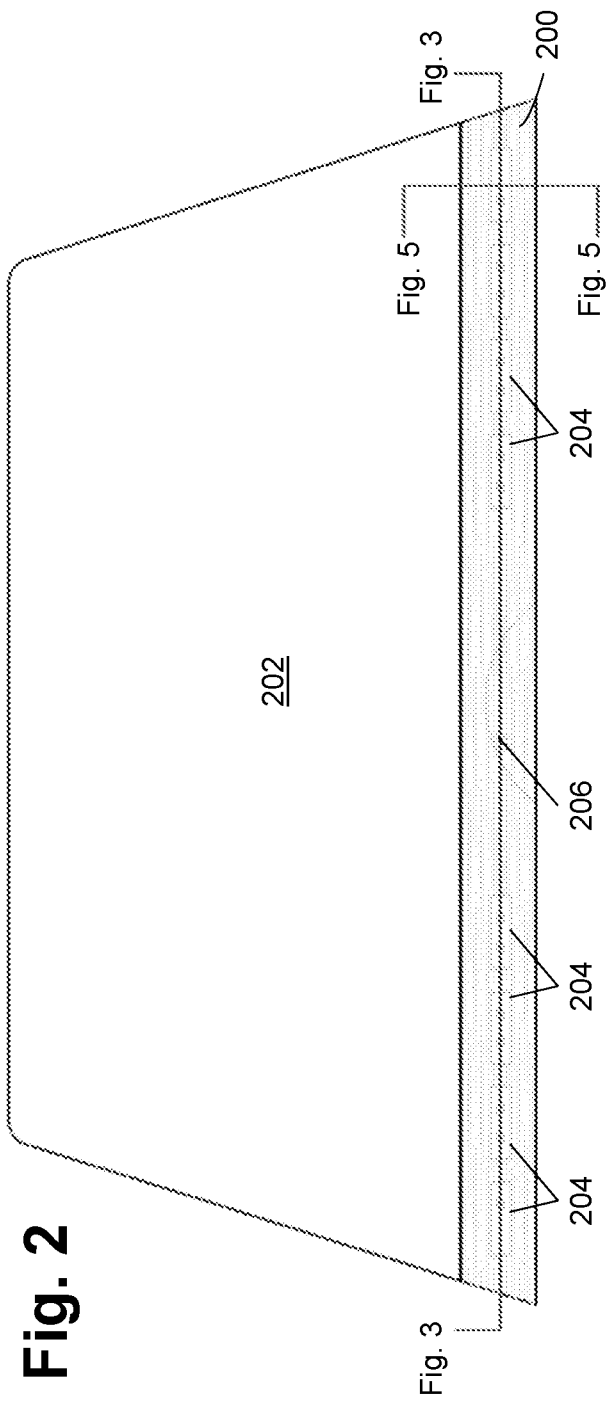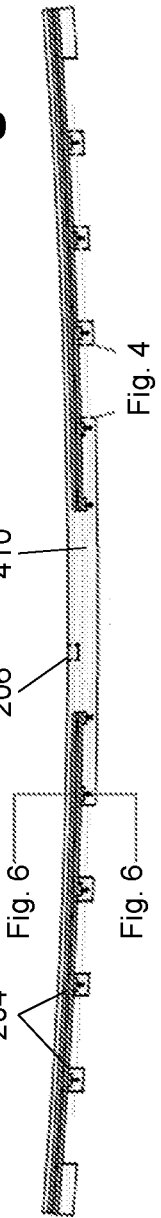

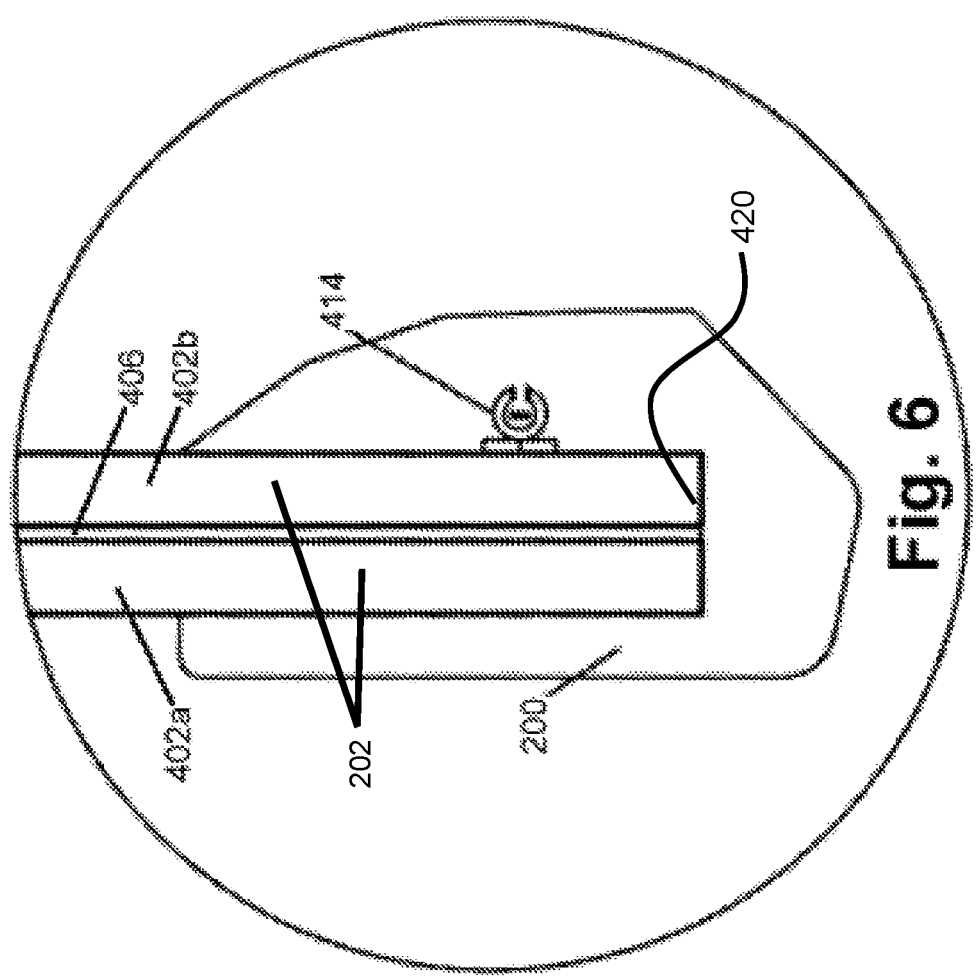

ENCAPSULATION-EMBEDDED EXTERIOR-FACING LIGHT SET FOR VEHICLES, AND/OR METHOD OF MAKING THE SAME

FIELD OF THE INVENTION

Certain example embodiments of this invention relate to glass-mounted safety and protection lighting arrangements for vehicles, and/or methods of making the same. More particularly, certain example embodiments of this invention relate to encapsulation-embedded exterior-facing light sets for vehicles, and/or methods of making the same.

BACKGROUND AND SUMMARY

Vehicles such as automobiles, trucks, motorcycles, and the like include lights and/or lighting elements in a number of different locations and for a number of different reasons. For example, vehicles typically include headlights, taillights, rear brake lights, center high-mount stop lamps (CHMSLs), fog lights or running lights, etc. Front and rear left/right turn indicators (blinkers) are commonly required in most automotive vehicles, and supplemental blinkers are now often included on side mirrors. School busses oftentimes incorporate white flashing lights on their roofs, as well as red flashing lights on extendible stop signs.

Emergency vehicles also include recognizable external lights. In the United States, for example, it is common for federal, state, and local law enforcement vehicles to include red, white, and/or blue lights that are actuatable in case of emergency. Ambulances often include red and white lights. Parking enforcement personnel, park police, and others oftentimes have yellow flashing lights.

Safety and protection vehicles (e.g., emergency vehicles) in the past have had bar-mounted and/or dome-shaped lighting mounted externally to these vehicles' roofs. Recently, however, there has been a trend away from this more "traditional" bar and/or dome lighting. Indeed, glass-mounted (e.g., front and/or rear windshield mounted) safety and protection lighting is now quite often preferred to the more traditional lighting arrangements. The trend toward such newer arrangements oftentimes enables safety and protection vehicles to better blend in with surrounding traffic, and frequently provides a more sleek and modern look compared to the traditional arrangements.

Current glass-mounted safety and protection lighting is mounted to the innermost surface of the glass glazing (e.g., on an interior surface of the front windshield and in the cabin of a police cruiser, or the like). Unfortunately, however, this mounting arrangement reduces the effective luminous intensity (e.g., candela) of the internal lighting, as a result of the reflection and absorption characteristics of the glazing to which it is mounted. In addition, this mounting approach can create primary and secondary reflective light patterns in the vehicle, which can be distracting and sometimes even dangerous. Shrouding oftentimes is used to help compensate for the reflective light, but the use of shrouding unfortunately limits the viewing area of the glazing.

It might be possible to improve glass-mounted safety and protection lighting arrangements by removing the frit provided to the internal glass around the edges (including the upper and/or lower edges). Doing so would allow high-power light sources to shine through the glass. Although this approach could reduce the amount of area covered up by the lighting arrangement, it unfortunately would not provide a fully effective solution for handling the reflected light.

Thus, it will be appreciated that it would be desirable to provide improved glass-mounted safety and protection lighting arrangements that overcome these and/or other disadvantages. For example, it will be appreciated that it would be desirable to provide improved glass-mounted safety and protection lighting arrangements that have high candela output, reduced internal reflections, and/or the like.

One aspect of certain example embodiments of this invention relates to encapsulation-embedded exterior-facing light sets for vehicles, and/or methods of making the same.

Another aspect of certain example embodiments of this invention relates to light emitting diode (LED) and/or other lighting elements encapsulated/molded to the exterior of glass glazings for safety and protection vehicle lighting used in connection with safety and protection vehicles.

Another aspect of certain example embodiments of this invention relates to having embedded wires encapsulated within a molding on a glass glazing to supply power and/or data to interchangeable and fixed exterior mounted lighting, sensors, and/or the like.

Certain example embodiments relate to an encapsulation-embedded exterior-facing light set system for a safety and/or protection vehicle comprising a main body portion. Wire guides are embedded in, and located along a channel of, the main body portion. Pockets are formed in the main body portion. Removable light sources are located in the pockets. A power cable is fed through the wire guides and through the channel of the main body portion, and is operably connected to the light sources. A groove is shaped and arranged to receive a windshield of the safety and/or protection vehicle such that, when the groove receives the windshield and the windshield is installed in the vehicle, the pockets and the light sources are external to the vehicle.

Certain example embodiments relate to a molding comprising a main body portion. Outward-facing pockets are formed in the main body portion, with the pockets being sized, shaped, and arranged to accommodate a plurality of removable light sources. Wire guides are located along a channel formed in the main body portion, with the channel being sized, shaped, and arranged to accommodate a power and/or data wire(s). A groove is sized, shaped, and arranged to receive a windshield of a vehicle such that the pockets are external to the vehicle.

Certain example embodiments relate to a method of making an encapsulation-embedded exterior-facing light set system for a vehicle, the method comprising: forming a main body portion including a plurality of outward-facing pockets formed therein, the pockets being sized, shaped, and arranged to accommodate a plurality of removable light sources; locating a plurality of wire guides along a channel formed in the main body portion, the channel being sized, shaped, and arranged to accommodate a power and/or data wire(s); and forming in the main body portion a groove sized, shaped, and arranged to receive a windshield of the vehicle in an orientation where the pockets are external to the vehicle. The method may further comprise, in certain example embodiments, feeding a power cable through the wire guides and through the channel of the main body portion; locating a plurality of removable light sources in the pockets; and connecting the power cable to the light sources.

Methods for using and/or configuring these and/or other systems also are contemplated herein.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 2 a front elevation view showing, schematically, an outside view of a vehicle glazing showing wiring/termination for another example molding 200 in accordance with certain example embodiments;

FIG. 3 is a view through the correspondingly labeled section line from FIG. 2;

FIG. 6 is a view through the correspondingly labeled section line from FIG. 3.

DETAILED DESCRIPTION OF EXAMPLE EMBODIMENTS OF THE INVENTION

Certain example embodiments relate to encapsulation-embedded exterior-facing light sets (e.g., LED light sets) for vehicles, and/or methods of making the same. In certain example embodiments, a glass glazing of a vehicle (e.g., front and/or rear windshield) is at least partially encapsulated with a molding having interchangeable pockets into which high-powered LED and/or other light sources may be inserted, for use in safety and protection industry vehicles. For example, both wiring and pockets may be encapsulated in a molding provided on and/or to the external glass surface(s), advantageously allowing for various types of interchangeable high-power LED and/or other light sources to be mounted to the external surface(s) of the glass glazing(s). One or more channels formed in the molding advantageously may provide interchangeability of LEDs (in terms of type and/or one-to-one replacement). For example, the ability to customize power and/or color configurations can greatly increase the flexibility of lighting selections, while also potentially reducing the reflection and effective candela reduction problems associated with current glass-mounted arrangements. That is, in certain example embodiments, externally-mounted LED and/or other lighting advantageously solves and/or reduces problems associated with vehicles' glass glazings reducing the effective output of the emergency lighting elements and reducing overall visibility for those inside of the vehicles. In certain example embodiments, the shrouding oftentimes used to prevent or reduce reflections of internal lighting into the vehicle cab reduces visibility can be eliminated, as externally-mounted lighting would not necessarily require this shrouding in all example embodiments.

Figure 1:
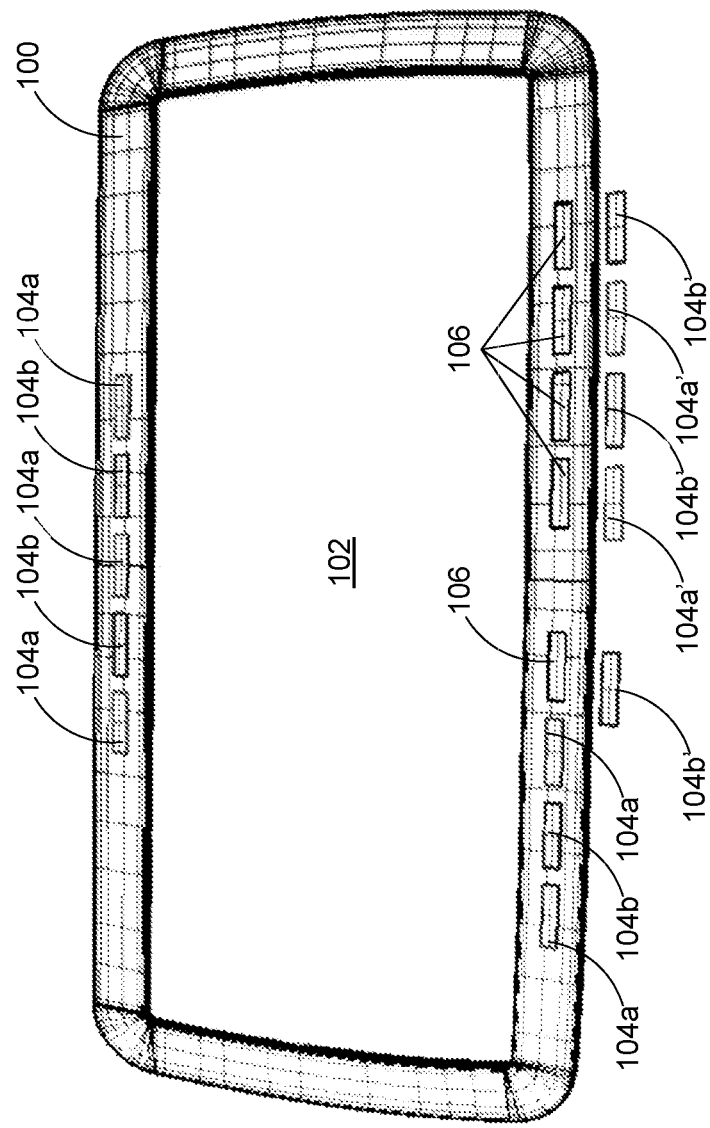
FIG. 1 is a front elevation view of a molding in accordance with an example embodiment.

Referring now more particularly to the drawings in which like numerals indicate like parts throughout the several views, FIG. 1 is a front elevation view of a molding 100 in accordance with an example embodiment. The FIG. 1 example molding may be formed from any suitable material and in any suitable way. For example, the molding 100 may be formed from a urethane, plastic, polymer, or other material, e.g., via a Reaction Injection Molding (RIM) process, extruding, co-extruding, and/or the like. As shown in FIG. 1, the molding 100 includes a large open area 102 corresponding to the viewable portion of the underlying glazing (not shown). The molding 100 includes a plurality of pockets 106, and lighting elements 104a, 104a' 104b, and 104b' (which may be the same or different types of lighting elements in different example embodiments) may be inserted therein. For example, lighting elements 104a' may be red, and 104b' may be blue, LED or other light sources. Once inserted into the pockets 106, they may be connected to data and/or power wires, e.g., as described in greater detail below. The connected red and blue LED elements 104a and 104b, once properly installed in the pockets 106 and connected to the power and/or data wires, may be selectively actuated as appropriate for the safety and protection vehicle.

In FIG. 1, the molding 100 is shown as framing the entire window. However, it will be appreciated that in other example embodiments, the molding may frame only a portion of the window, e.g., the upper and/or lower portions of the window. Also, FIG. 1 shows only lighting elements. However, in other example embodiments, the molding may house other electronic devices such as, for example, control electronics, temperature sensors, radar and/or lidar detectors, proximity sensors, and/or the like.

Figure 4:
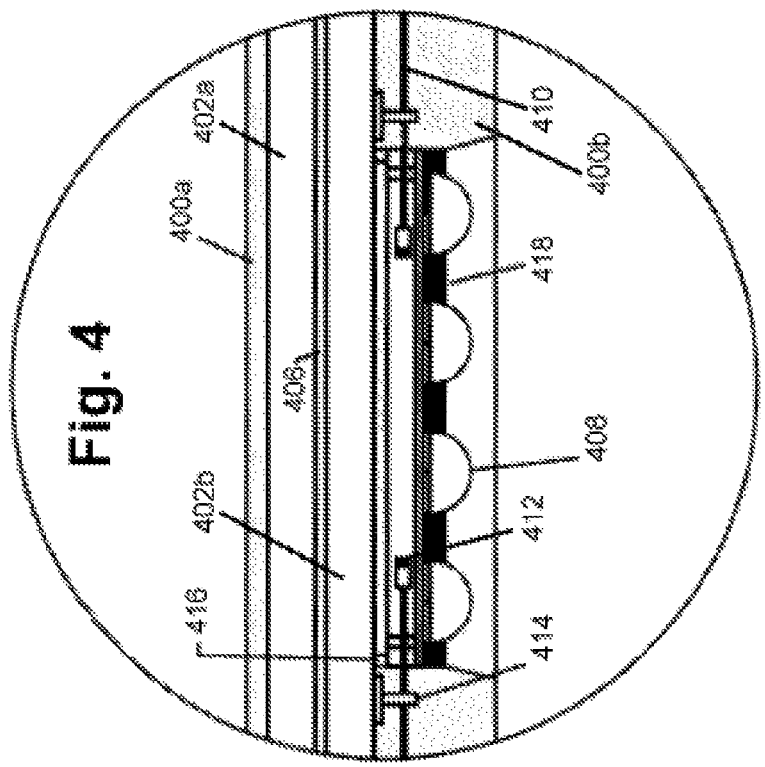
FIG. 4 is an enlargement of the corresponding labeled area of FIG. 3.

FIG. 2 is a front elevation view showing, schematically, an outside view of a vehicle glazing 202 showing wiring/termination for another example molding 200 in accordance with certain example embodiments; and FIG. 3 is a view through the correspondingly labeled section line from FIG. 2; FIG. 4 is an enlargement of the corresponding labeled area of FIG. 3.

Referring first to FIGS. 2-3, the molding 200 is a part of the vehicle glazing lighting system, which includes over-molded inserts within the over-molded rim for housing LEDs; secondary LED optics; wiring harnesses to supply power to the pockets; etc. As will be appreciated from the description herein, the vehicle glazing light system may be used to project light outside, and from the exterior, of the vehicle. Each pocket 204 may house one or more LEDs and associated optics so as to create an "external light bar" that is thereby integrated into the glazing. With an over-molded cutout or channel in the glazing, the glazing provides a pass-through for the external wiring harness within the over-mold for connection on the interior of the vehicle to a power connector that advantageously is protected from the exterior environment. Power may be provided from the center power source 206 to the pockets 204 via wires 410. For example, openings may be provided proximate to the pockets for receiving the power and/or data wire(s) and for facilitating connection between the power and/or data wire(s) and light sources provided to the respective pockets.

Referring now to FIG. 4, which is an enlargement of the corresponding labeled area of FIG. 3, it can be seen that the glazing 202 includes first and second substrates 402a and 402b, which are substantially parallel to and spaced apart from one another. The first and second substrates 402a and 402b may be glass substrates that are heat treated (e.g., thermally tempered) or left in an annealed state. A polymer-based interlayer 406 such as, for example, PVB, EVA, PET, or the like, may be used to laminate together the first and second substrates 402a and 402b. As will be appreciated from FIG. 4, for example, first and second substrates 402a and 402b respectively serve as the inner and outer substrates of a vehicle windshield.

This example will be described in connection with a urethane molding 200 for ease of understanding. It will be appreciated, however, that other materials may be used, as noted above. As shown in the FIG. 4 enlargement, an inner portion 400a of the urethane molding 200 is provided on an interior surface of the inner substrate 402a (e.g., so that it is basically within the vehicle), whereas an outer portion 400b of the urethane molding 200 is provided on an exterior surface of the outer substrate 400b and thus is external to the vehicle.

A high-powered LED module having associated optics (e.g., diffusing lenses, collimating lenses, out-coupling efficiency enhancing materials, and/or the like) 408 is provided to the example pocket shown. The LED module 408 is shown as including a plurality of diodes in this example, although it will be appreciated that more or fewer LEDs may be provided in a given pocket as indicated above. The LED module 408 is external to the vehicle, as it is provided exterior to the outer substrate 402b, as clearly shown in FIG. 4. It will be appreciated that once the LED module 408 is provided in the pocket, it is in essence encapsulated in the molding 200. Although LED light sources as described, it will be appreciated that other light sources may be used in different example embodiments of this invention.

The wire 410 includes a connector 412, which powers the LED module 408 shown in FIG. 4. The wire 410 is fed through wire guides 414 encapsulated within the urethane molding 200. In certain example embodiments, the wire guides 414 may be co-extruded with the other portions of the molding. In certain example embodiments, the wire guides 414 may be provided after the molding 200 is formed. In certain example embodiments, the main body portion of the molding 200 and the wire guides 414 may be formed from the same material.

A stand-off 416 and/or other features is formed in the molding 200. The stand-off 416 and/or other features advantageously provide a place for adhesive material to flow, helping to secure the molding 200 to the glazing. As shown in FIG. 4, the stand-off 416 is provided proximate to the outer substrate 402b, but it will be appreciated that stand-offs and/or other features additionally or alternatively may be provided with respect to the inner substrate 402a. In certain example embodiments, the stand-off 416 may provide for urethane flow (e.g., such that urethane provides adhesion between the molding 200 and the glazing). PET, EVA, PVB, glues, and/or other adhesives may be used in different example embodiments.

A sealant 418 may be provided over (e.g., over and contacting) the LEDs in the LED module 408. This sealant may be a part of the module 408 itself, or it may be added once the module 408 is inserted into the pocket.

Figure 5:
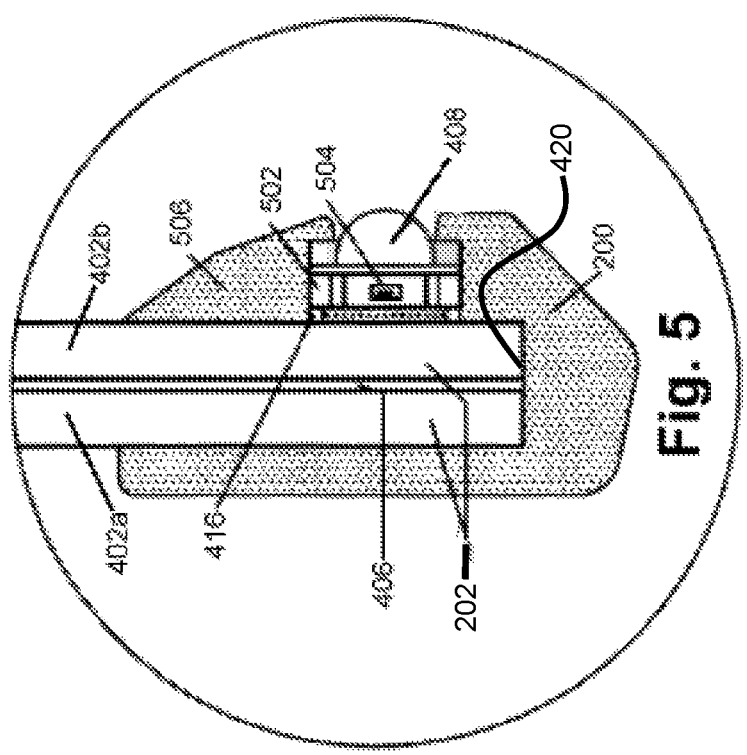
FIG. 5 is a view through the correspondingly labeled section line from FIG. 2.

FIG. 5 is a view through the correspondingly labeled section line from FIG. 2. FIG. 5 shows a metallic LED pocket insert 502. This insert 502 may include a power port 504, so that the connector 412 from the wire 410 can be easily connected to the LED module 408, once the LED module 408 is inserted into the pocket. In certain example embodiments, the insert 502 may be added into the pocket prior to the module 408 so that the module can be placed (and replaced) more easily. The metallic insert 502 also may be at least partially reflective, thereby increasing the out-coupling efficiency of the LEDs.

FIG. 5 also depicts an example main cross-sectional profile for the over-mold encapsulation 200. As illustrated in Fig. 5, the molding 200 includes a groove 420 that is shaped and arranged to receive the glazing 202. The inner portion of the molding 200 adjacent the inner substrate 402a is substantially linear and has a substantially uniform thickness as it extends downward to the edge of the glazing 202. The lower portion of the molding 200 is thick enough to provide some cushioning for the glazing 202 in the event of impact and is rigid enough to hold it in place with respect to the frame of the vehicle. An upper portion 506 of the molding 200 adjacent to the outer substrate 402b preferably has an uppermost point that is not substantially different from the uppermost portion of the molding 200 on the inner side. The molding 200 preferably forms a water- and debris-resistant seal against at least the outer substrate 402b, so that water, dust, dirt, and/or the like does not build up between the molding 200 and the glazing 202. The molding 200 itself preferably is substantially impervious to water, thereby protecting the wires 410, at least some portions of the LEDs, etc.

Preferably, the molding 200 covers no more of the glazing than normally is covered by frit materials. This arrangement is advantageous for a number of reasons. For example, the glazing can be mass-produced as is conventional, with the frit material being applied thereto and without it having to be removed. The molding 200 preferably is added to a standard glazing. The frit can help obscure the back of the molding 200 (which itself obscures control electronics, the LED, reflections, and/or the like). In this way, the glazing with the molding 200 may be provided to a vehicle with little to no modifications to the glazing and the vehicle.

FIG. 6 is a view through the correspondingly labeled section line from FIG. 3. FIG. 6 shows example wire guides 414 in greater detail, as well as one way in which the molding 200 may accommodate the glazing 202 comprising the first and second substrates 402a and 402b, which are laminated together with the polymer-based interlayer 406. Namely, the molding 200 includes a groove 420 that is shaped and arranged to receive the glazing 202. With respect to the latter, FIG. 6 shows a view similar to that depicted in FIG. 5.

Figure 7:
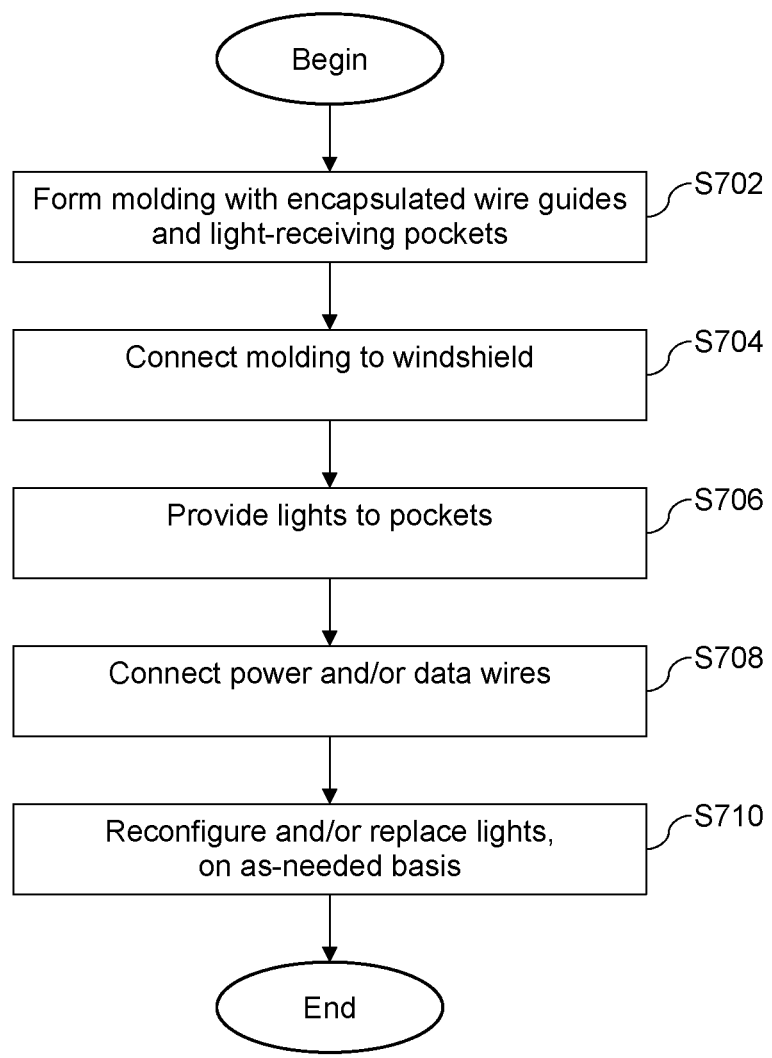
FIG. 7 is a flowchart showing an example method of making a lighting assembly in accordance with certain example embodiments.

FIG. 7 is a flowchart showing an example method of making a lighting assembly in accordance with certain example embodiments. In step S702, the molding is formed, e.g., so as to have encapsulated wire guides and light-receiving pockets. The molding is connected to the glazing (e.g., front or rear windshield) in step S704, and lights are provided to the pockets in step S706. Power and/or data wires are provided to the lights in step S708. Optionally, the lights may be reconfigured and/or replaced on an as-needed basis.

It will be appreciated that these steps may be merged in at least some respects. For example, as noted above, the molding may be created using a low pressure RIM process similar to that commonly used in glass manufacturing today, e.g., in connection with weather seals and the like. In an example RIM-inclusive process, the glass, wires, and channels are inserted into a mold and then the urethane or other material is injected around the glass and wire/channel assemblies to produce a single piece (glass with molding including pockets) upon completion. In certain example embodiments, the connectors, wiring, and LED pockets may be created by placing the assemblies in an encapsulation mold with the glass, and injecting a two-part liquid urethane around all the components to create the corresponding features. This process generates very low mold pressures, has excellent flow characteristics, and can be implemented at current facilities using existing technology. Specific features of the mold may create the voids within the inserted metal LED pockets for later installation of the LED boards in some implementations. In certain example embodiments, direct injection molding of a thermoplastic (e.g., PVC, Santoprene, TPU, and/or the like) may be used to create desired features, and the molding may be directly molded to the glass by having it inserted in the molding tools/process.

It will be appreciated that over-molded and encapsulated lighting may be used for emergency vehicle lighting (e.g., when stealth is valued), as well as other applications. For example, the techniques described herein may be useful for applications requiring high-power off-road lighting such as might be useful in the power sports or off-road industries, as an approach for integrating entire rear lighting assemblies into glass such as for truck bed illumination, combination signal, brake, and CHMSL applications, etc. In similar configurations, high-power embedded LED modules or the like may be used on the interior of glass for hatchback area lighting and/or the like.

Although certain example embodiments have been described as including glass substrates, it will be appreciated that other types of transparent substrates may be used in different example embodiments.

The terms "heat treatment" and "heat treating" as used herein mean heating the article to a temperature sufficient to achieve thermal tempering and/or heat strengthening of the glass-inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, up to about 10 minutes, up to 15 minutes, etc., in certain example embodiments.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, an encapsulation-embedded exterior-facing light set system for a safety and/or protection vehicle is provided. It includes a main body portion. A plurality of wire guides is embedded in, and located along a channel of, the main body portion. A plurality of pockets is formed in the main body portion. A plurality of removable light sources is located in the pockets. A power cable is fed through the wire guides and through the channel of the main body portion and operably connected to the light sources. A groove is shaped and arranged to receive a windshield of the safety and/or protection vehicle such that, when the groove receives the windshield and the windshield is installed in the vehicle, the pockets and the light sources are external to the vehicle.

In addition to the features of the previous paragraph, in certain example embodiments, the light sources may be LED light sources.

In addition to the features of either of the two previous paragraphs, in certain example embodiments, each pocket may include plural LEDs.

In addition to the features of any of the three previous paragraphs, in certain example embodiments, the main body portion may include at least one stand-off configured to facilitate adhesion to the windshield.

In addition to the features of any of the four previous paragraphs, in certain example embodiments, reflective metal pocket inserts may be provided to the pockets.

In addition to the features of any of the five previous paragraphs, in certain example embodiments, the main body portion may be sized and shaped to be completely obscured from view from the vehicle's interior.

In addition to the features of any of the six previous paragraphs, in certain example embodiments, the main body portion may be sized and shaped to correspond to a size and shape of frit provided to the windshield.

In addition to the features of any of the seven previous paragraphs, in certain example embodiments, the main body portion may be formed from urethane.

In addition to the features of any of the eight previous paragraphs, in certain example embodiments, embedded sensor electronics also may be powered by the power cable.

In addition to the features of any of the nine previous paragraphs, in certain example embodiments, the main body portion may be sized and shaped so as to extend along the entire upper edge of the windshield.

In certain example embodiments, there is provided a vehicle comprising the system of any of the 10 previous paragraphs.

In certain example embodiments, there is provided a molding including a main body portion. A plurality of outward-facing pockets is formed in the main body portion, with the pockets being sized, shaped, and arranged to accommodate a plurality of removable light sources. A plurality of wire guides is located along a channel formed in the main body portion, with the channel being sized, shaped, and arranged to accommodate a power and/or data wire(s). A groove is sized, shaped, and arranged to receive a windshield of a vehicle such that the pockets are external to the vehicle.

In addition to the features of the previous paragraph, in certain example embodiments, the main body portion may be formed from urethane.

In addition to the features of either of the two previous paragraphs, in certain example embodiments, the wire guides and the main body portion may be formed from the same material.

In addition to the features of any of the three previous paragraphs, in certain example embodiments, openings may be provided proximate to the pockets for receiving the power and/or data wire(s) and for facilitating connection between the power and/or data wire(s) and light sources provided to the respective pockets.

In addition to the features of any of the four previous paragraphs, in certain example embodiments, the main body portion may include at least one stand-off configured to facilitate adhesion to the windshield.

In certain example embodiments, there is provided a vehicle comprising the molding of any of the five previous paragraphs.

In certain example embodiments, there is provided a method of making an encapsulation-embedded exterior-facing light set system for a vehicle, the method comprising: forming a main body portion including a plurality of outward-facing pockets formed therein, the pockets being sized, shaped, and arranged to accommodate a plurality of removable light sources; locating a plurality of wire guides along a channel formed in the main body portion, the channel being sized, shaped, and arranged to accommodate a power and/or data wire(s); and forming in the main body portion a groove sized, shaped, and arranged to receive a windshield of the vehicle in an orientation where the pockets are external to the vehicle.

In addition to the features of the previous paragraph, in certain example embodiments, a power cable may be through the wire guides and through the channel of the main body portion; a plurality of removable light sources may be located in the pockets; and the power cable may be connected to the light sources.

In addition to the features of either of the two previous paragraphs, in certain example embodiments, the light sources may be LED light sources, e.g., with each pocket receiving a plurality of LEDs provided on a respective LED module and an associated optical element.

In addition to the features of any of the three previous paragraphs, in certain example embodiments, the light system may be formed, at least in part, using a reaction injection molding process.

In addition to the features of any of the four previous paragraphs, in certain example embodiments, the system may be formed directly on the glass.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An encapsulation-embedded exterior-facing light set system for a vehicle, comprising:
   a main body portion for installation in a vehicle;
   a plurality of wire guides embedded in and located along a channel of the main body portion;
   a plurality of pockets formed in the main body portion;
   a plurality of removable light sources located in the pockets;
   a power cable fed through the wire guides and through the channel of the main body portion and operably connected to the light sources;
   a groove formed in the main body portion shaped and arranged to receive a windshield of the vehicle such that when the groove receives the windshield the main body portion at least partially extends along an outer edge of the outward facing surface of the windshield and the windshield is installed in the vehicle, the pockets and the light sources are external to the vehicle.

2. The system of claim 1, wherein the light sources are LED light sources.

3. The system of claim 2, wherein each pocket includes plural LEDs.

4. The system of claim 2, wherein the main body portion includes at least one stand-off configured to facilitate adhesion to the windshield.

5. The system of claim 1, further comprising reflective metal pocket inserts provided to the pockets.

6. The system of claim 1, wherein the main body portion is sized and shaped to be completely obscured from view from the vehicle's interior.

7. The system of claim 1, wherein the main body portion is sized and shaped to correspond to a size and shape of frit provided to the windshield.

8. The system of claim 1, wherein the main body portion is formed from urethane.

9. The system of claim 1, further comprising embedded sensor electronics also powered by the power cable.

10. The system of claim 1, wherein the main body portion is sized and shaped so as to extend along the entire upper edge of the outward facing surface of the windshield.

11. A vehicle comprising the system of claim 1.

* * * * *